United States Patent Office.

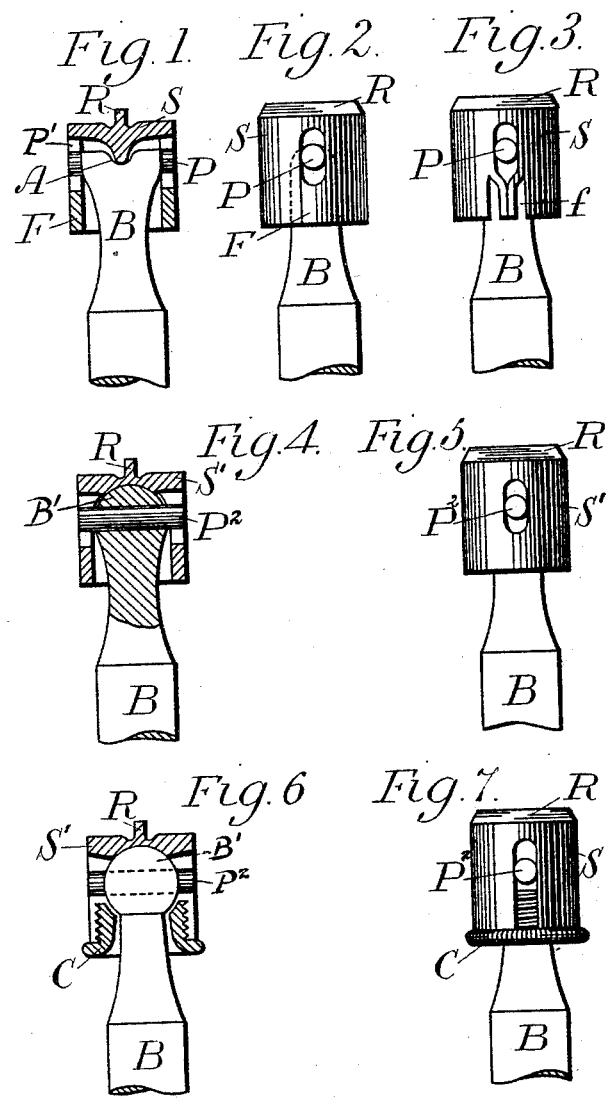

ARNULPH MALLOCK, OF LONDON, ENGLAND.

SCREW-DRIVER.

SPECIFICATION forming part of Letters Patent No. 519,962, dated May 15, 1894.

Application filed December 1, 1893. Serial No. 492,498. (No model.) Patented in England June 13, 1893, No. 11,611.

*To all whom it may concern:*

Be it known that I, ARNULPH MALLOCK, a citizen of England, residing at No. 3 Victoria Street, in the city of London, England, have invented an Improvement in Screw-Drivers, (for which I have received Letters Patent in Great Britain, No. 11,611, dated June 13, 1893,) of which the following is a specification.

In turning a screw driver it is difficult to keep its axis in line with that of the screw to which it is applied, and consequently its chisel end is liable to escape from the notch of the screw, or to act so unequally as to deform the notch.

My invention relates to a construction of screw driver by which these difficulties are overcome. For this purpose, I make the shank of the screw driver with its end part round and terminating in a hemisphere, cone or conoid or in a face having a conical or conoidal hollow sunk in it. On this end I fit somewhat loosely a socket which is held in place in such a manner that the socket, loosely fitting the end of the shank, can rock upon it, as it were on a spherical joint, but must turn with it. The face of the socket has a central projecting rib which acts as the chisel end of an ordinary screw driver when inserted in the notch of a screw, but, owing to the freedom which the socket has to rock, moderate deviation of the shank from the axial line of the screw does not tend to make the chisel rib escape from the notch. I prefer to make the face of the socket with a slight rounded hollow on each side of the projecting rib so that there is no sharp angle at the base of the rib.

In the accompanying drawings I show, by way of examples, several different ways in which the socket can be mounted on the end of the shank.

Figure 1 is a sectional view of the socket, showing a portion of the shank in elevation. Fig. 2 is a side elevation of the same. Fig. 3 is a similar view, showing a modification in the means for holding the socket in position on the shank. Fig. 4 is a detail sectional view, showing another modification. Fig. 5 is a side elevation of the same. Fig. 6 is a detail sectional view, showing another modification; and Fig. 7 is a side elevation of the same.

In the drawings the letter S indicates a cylindrical or other suitably shaped hollow head or socket provided with an internal pivot A bearing in a countersunk hollow formed in the end of the shank B which is made with pins P projecting at both sides into slots P' formed in the socket these slots being closed by filling pieces F brazed or otherwise fixed in the slots after the end of the shank and its pins have been introduced into the socket. The closing of the slots may be effected, as shown in Fig. 3, by cutting a slit on each side of the slot and bending in the metal between these slits and the slot as indicated at $f$. Figs. 4 and 5 show the shank made with an end B' spherical or nearly so, a pin $P^2$ being passed in through the slots of the socket and the spherical head. As shown in Figs. 6 and 7, the socket S' has the spherical end of the shank and its lateral pins retained in it by a cap C screwed in.

In all the figures above referred to, the rib R, which serves as the operating chisel end of an ordinary screw driver, is shown with a rounded hollow at each side. This construction is preferred as there is thus less risk of the rib breaking off the socket than there would be if there were angles at the springing of the rib from the socket. Moreover as sometimes there is a burr on the head of a screw where it is slotted to receive the screw driver, the hollow on each side of the rib allows of the face of the socket bearing evenly on the whole head of the screw notwithstanding there may be such burrs.

I have shown by way of example several constructions by which the screw driver shank can be provided with a socket free to rock to a certain extent on it, but obviously the construction and form of the end of the shank and of the socket which receives it may be varied, provided that while the socket must turn with the shank, it has freedom to rock on it sufficiently to allow for the ordinary deviation of the hand from the axial line in turning a screw driver.

Having thus described the nature of my said invention and the best means I know for carrying the same into practical effect, I claim—

1. The combination with the shank of a screw-driver, having a curved extremity, of a hollow head or socket having a screw-engaging rib and provided internally with a curved bearing surface resting upon the extremity of the said shank for enabling the head or socket to freely rock in every direction, and means for retaining the head or socket in operative connection with the shank, substantially as described.

2. The combination with the shank of a screw-driver, of a slotted hollow head having a screw-engaging rib and universally jointed directly to the end of the shank to freely rock in all directions, and a pin arranged on said shank and playing in the slotted part of the hollow head, substantially as described.

3. The combination with the shank of a screw-driver, of a hollow head having a screw-engaging rib and side slots and jointed to and inclosing one end portion of the shank, and a pin fixed to the shank and playing in the side slots of the hollow head, substantially as described.

In testimony whereof I have signed my name to this specification, in the presence of two subscribing witnesses, this 16th day of November, 1893.

ARNULPH MALLOCK.

Witnesses:
OLIVER IMRAY,
*Chartered Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*